United States Patent [19]

Cohen

[11] 4,217,607
[45] Aug. 12, 1980

[54] PROCESS AND DEVICE FOR THE INSTANTANEOUS DISPLAY OF A COUNTRYSIDE SCANNED BY A CAMERA OF THE SINGLE LINE SCANNING TYPE

[75] Inventor: Jean-Pierre D. Cohen, Villiers-le-Bel, France

[73] Assignee: Societe Anonyme de Telecommunications, Paris, France

[21] Appl. No.: 943,867

[22] Filed: Sep. 19, 1978

Related U.S. Application Data

[63] Continuation of Ser. No. 571,228, Apr. 24, 1975, abandoned.

[30] Foreign Application Priority Data

May 7, 1974 [FR] France .................... 74 15769

[51] Int. Cl.$^2$ ............................. H04N 7/18
[52] U.S. Cl. .................... 358/109; 358/223; 343/5 PC
[58] Field of Search ............. 358/109, 223; 354/65; 343/5 R, 5 PC, 112 A; 250/214 R, 236

[56] References Cited

U.S. PATENT DOCUMENTS

| | | | |
|---|---|---|---|
| 2,668,190 | 2/1954 | Sziklai | 358/223 |
| 2,911,876 | 11/1959 | Willey | 358/109 |

Primary Examiner—Robert L. Griffin
Assistant Examiner—Edward L. Coles
Attorney, Agent, or Firm—Kemon & Estabrook

[57] ABSTRACT

A process for the instantaneous display of a countryside scanned by a camera apparatus of the single line scanning type, comprising charging the target of a double gun tube, acting as an intermediate information support between the single line scanning apparatus and a television receiver, by a first gun of the double gun tube along a writing line, in the effective rotation of the single line scanning device in the course of one period of the scanning video signal, said writing line moving over the target in accordance with a writing picture scanning the slope of which depends on the ratio V/H of the support of the camera apparatus, erasing the lines already written and stored so as to define on the target a moving rectangle which is not charged, in memory reading the space of the target which is charged in memory by a scanning effected by the second gun of the double gun tube at the television rate, the beginning and the end of the reading corresponding to two lines which move over the target in accordance with the reading picture scanning and are disposed respectively on each side of said moving rectangle, and sending the modulated current of the reading of the target, which constitutes the television video signal, to the television receiver.

4 Claims, 10 Drawing Figures

PROCESS AND DEVICE FOR THE INSTANTANEOUS DISPLAY OF A COUNTRYSIDE SCANNED BY A CAMERA OF THE SINGLE LINE SCANNING TYPE

This is a continuation of application Ser. No. 571,228, filed Apr. 24, 1975, now abandoned.

The present invention relates to a process, and device for carrying out said process, which permit the display, in real time, of a countryside flown over from signals received by an aerial camera of the single line scanning type which operates continuously during the effective duration of the flight of a flying machine carrying it.

In single line scanning cameras, the scanning of a line of the field to be scanned is carried out by the displacement, by means of a mirror or rotating prism, of a narrow optical elementary field, of the order of a few milliradians, in a large effective scanning angle, for example 20° or 40°. The line scanning frequency depends on the speed of rotation of the mechanical scanning system, namely the mirror or prism, and may vary, depending on the equipments employed, from 20 to 800 Hz. The picture scanning is carried out by the displacement of the machine carrying the single line scanning apparatus.

This type of apparatus is above all employed for aerial scouting. The apparatus is carried in a carrying machine flying horizontally at an altitude H and at a velocity V and scans for each scanning line a strip of ground whose width at the vertical to the carrier is H. $\Delta\alpha$, $\Delta\alpha$ being the elementary field of the scanning apparatus and whose length, perpendicular to the line of flight is 2 H tan ($\alpha/2$), $\alpha$ representing the scanning angle of the scanning apparatus, for example 120° to 140°.

The picture forming time, whose ratio k between the length and the width is for example equal to 4/3 that is to say a ratio comparable to that of the dimensions of a television picture, depends on the ratio velocity/altitude, V/H, of the carrier, the scanning angle $\alpha$ and the proportions k of this picture. In the most usual cases, this time varies from 1 second to several tens of seconds. As compared to television camera tubes having short picture-forming times (1/25 sec), single line scanning apparatuses however offer the advantage of being capable of operating in the infra-red spectral range. In this case the optical system comprises a translator element, for example the sensitive surface of an infra-red detecting cell which converts into electric current the mean radiation given out by the elements on the ground included in each scanning spot and focused by the optical device. This current is modulated while the rotating mirror describes an effective angle $\alpha$; its alternating component is suppressed while the rotating mirror describes an angle ($2\pi - \alpha$) of rotation or dead angle. In the ensuing description this component will be termed the scanning video signal.

In the known single line scanning cameras various modulating signals are employed for exposing a photographic film in such manner as to obtain a continuous picture constituted by a large number of very narrow individual picture lines juxtaposed one after the other. The picture thus obtained is of excellent quality and the use of infra-red radiation permits filming at night or under meteorological conditions which would not permit the use of apparatus operating in the visible spectral range. However, the major drawback of these known apparatuses resides in the fact that the film can only be put to use after the mission has finished and the film has been developed. It will be understood that this requirement, for example in the case of ground surveying by a teleguided missile, is a serious limitation to the utility of these devices. On the other hand, known devices for displaying in real time, and in particular airborne television cameras, usually do not give pictures of sufficient definition for a satisfactory exploitation. Moreover, their utilisation is strictly limited to the visible range.

It is therefore desirable to be able to display instantaneously, in real time, the pictures taken by such a single line scanning apparatus. Such an instantaneous display requires storage in a memory of the signals received for supplying a display apparatus, for example a television receiver, with signals constituting the complete picture. Further, means must be provided for causing the picture displayed to progress at a speed proportional to that of the carrier machine, that is to say permanently enterring new picture lines from the memory removing, the corresponding picture lines and shifting the picture lines remaining displayed. Generally, the picture lines which are no longer displayed are erased from the memory in order to leave room for new picture lines scanned by the single line scanning apparatus.

An object of the present invention is therefore to arrange that there corresponds to each ground scanning line a horizontal picture line on the screen of an ordinary television receiver, that this line persists unchanged so long as it travels from the top to the bottom of the screen as the carrier machine is displaced in the course of the scanning, and that consequently the total picture observed is renewed without interruption by the writing or introduction at the top of the screen of a new line and by the simultaneous exit at the bottom of the screen of a line already introduced.

According to the invention, the three successive functions, namely the writing, the storage and the erasing of a picture line corresponding to a scanning video signal received for a given line in the course of the scanning of the ground flown over, are performed by a commercially available storage tube of the type having a double gun recorder.

By means of the invention it is possible to avoid the use of a remanent cathode ray tube and a system for reading the scanning video signal previously stored by means of semiconductor or ferrite memories. Indeed, the access time of a complete picture on the television screen is too long and varies too much in accordance with the V/H ratio of the normal conditions of navigation of the carrier machine; these two reasons do not permit the use of a remanent cathode ray tube as a display screen; consequently, if it is considered that the picture must have several contrast levels and that the elementary single line scanning angle $\Delta\alpha$ of the scanning spot is very small and of the order of a milliradian, calculation will show that the store must have several megabits of capacity, which requirement is incompatible with the desired compactness of the electronic equipment and moreover very expensive.

It will be observed that a double gun recording storage tube comprises essentially, on the same axis of symmetry, two electron guns which have separate controls and face each other on opposite sides of a thin target formed by a mosaic of insulating islands inserted in a grid connected to an output terminal.

It will also be observed that, owing to the properties of an electron gun, it is possible to write, read and erase charges taken by the insulating islands of the target by establishing each time a suitable fixed potential difference between the cathode of the gun and the grid of the target. In the writing and erasing operations, all of the charges of the islands may vary in accordance with the value of the instantaneous potential difference established between the cathode and the modulating grid of the gun in question.

Consequently, an object of the invention is to provide a process for the instantaneous display of a countryside scanned by a camera apparatus of the single line scanning type, comprising charging the target of a double gun tube acting as an intermediate information support between the single line scanning apparatus and a television receiver, by a first gun of said double gun tube along a writing line during the effective rotation of the single line scanning apparatus in the course of one period of the scanning video signal, said writing line moving over the target in accordance with a picture writing scanning whose slope depends on the ratio V/H of the support of the camera apparatus, erasing the lines already written and stored in a memory so as to define on the target a moving rectangle which is not charged in memory, reading the memory charged space of the target by a scanning effected by the second gun of the double gun tube at the television rate, the beginnings and ends of the reading corresponding to two lines which move over the target in accordance with the picture writing scanning and respectively disposed on each side of said moving rectangle, and sending the modulated target reading current, which constitutes the television video signal, to the television receiver.

In one embodiment, the erasing of a line which is written and charged in memory is effected by the writing gun in the course of the rotation within the dead angle of the single line scanning apparatus in each period of the scanning video signal.

In a modification, the erasing of a written line charged in memory is effected by the reading gun, by a series of consecutive slight evasives each produced during the return time of the picture scanning of the reading gun.

Another object of the invention is to provide a device for carrying out the aforementioned process.

It will be observed that the writing is effected at low frequency not exceeding 1000 Hz, corresponding to the writing of a picture in a time exceeding one second, whereas the reading is effected at a standard television frequency corresponding, for example, to the reading of 50 frames per second.

The signals controlling the ddp of the target-cathode grid have for function to determine the mode of operation of the gun concerned. To simplify, only one single gun will be considered and it will be assumed that the cathode of the gun is always grounded. A memory tube operates as is known from the secondary emission phenomenon in the insulators in response to the impact of primary electrons in the material. It will be recalled that there is a value termed the "cross over voltage" of the ddp target-cathode in respect of which the ratio of the number of secondary electrons re-emitted to the number of incident primary electrons is just equal to unity. Beyond this limit value, the fact of extracting more electrons than there are furnished is equivalent to bringing to the insulator a positive overall charge. Within this limit value, the reverse case is equivalent to taking off a part of the overall positive charge which was previously accumulated.

With reference to FIG. 1 of the accompanying drawing which illustrates the operation of a known double gun tube, it will be assumed in FIG. 1a that the voltage +15 V applied to the target grid corresponds to this latter case. It is here evident that the overall potential of the insulator cannot drop below the potential of the cathode since, if it were so, no electron could reach the insulator. In other words, there remains a charge accumulated in the insulator proportional to the difference of 15 V between the target grid and the overall potential, 0 volt, of the insulator.

In FIG. 1b the foregoing potentials have been brought respectively to 50 V and 35 V. This other case happens when the secondary emission balance is higher than 1 if primary electrons impinge on the insulator. For example, three possibilities will be assumed: no primary electron arrives, or the energy of the excess primary electrons is medium, or the energy of the primary electrons is high. In respect of the last two cases, the supply of positive charges increases the overall potential of the insulator, for example respectively by 5 and 10 V.

In the case shown in FIG. 1c, the potential of the target grid is only 5 V. It can be seen that the overall potential of the charges never exceeds the cathode potential. It therefore remains unchanged, since it is not modifiable by the incident electrons. Moreover, the potential values in question are such that if the potential of the insulator is −10 V, no electron emitted by the cathode reaches the target grid; if this potential is −5 V, a part might reach it; if it is 0 V, it does not oppose the electrons reaching of the target grid.

Corresponding to the three cases (a, b, c,) of FIG. 1 are the respective functions: erasing, writing, reading of the storage element constituted by an island of the target upon which a thin beam of electrons emitted by the cathode impinges. In the two extreme cases (a) and (c), this beam is of constant intensity. In the case (b) this beam is modulated in intensity and one of the three possibilities (and their intermediaries) of the Figure may occur. Owing to the fact that the relative potential acquired between the insulator and the target grid is not affected in the course of the reading function, namely case (c), it is stored and this storage is that of the instantaneous intensity of the beam of the primary electrons existing in the course of the writing function, namely case (b). There corresponds thereto in the course of the reading function, namely case (c), a current in the target grid which is more or less important depending on the fraction of the primary electrons, having a constant flow, that the overall potential of the insulator determines as being capable of effectively reaching the target grid. In other words, for the same point of the target, the instantaneous value of the target grid current corresponds to the instantaneous intensity of the beam of writing electrons which charged this point.

Whatever be the charged content of the insulating island, this content is erasable in the case (a) of FIG. 1. It is clear that a subsequent reading is manifested by a nul current in the target grid.

According to the invention, one of the two guns is given the writing function and the other gun the reading function, and either gun the erasing function.

In the first case, the writing gun writes in the effective part of the scanning video signal and erases in the dead time of this signal. This dead time is divided between the erasing time proper and a blocking time, at the cut-off voltage of the Wehnelt grid with respect to the cathode.

In respect of the reading gun, the cut-off voltage is applied during the return interval of the line and picture scannings, of the ordinary television system, for example having 625 lines.

In the second case, the writing gun writes during the effective part of the scanning video signal and the cut-off voltage is applied between the dead time of the scanning video signal which corresponds to the return interval of the line scanning.

In the latter case, the reading gun carries out the erasing operation. Although these two cases, namely erasing by the writing gun and erasing by the reading gun, are part of the present invention, the embodiment in which the erasing is carried out by the writing gun is particularly interesting, since it permits the judicious utilisation of the dead time of the scanning video signal. It is therefore in this particular case, namely erasing by the writing gun, that there will be described hereinafter, by way of example, one embodiment of the device according to the invention.

The reading line scanning is, in the normal way, ensured by a current in the corresponding coil of the reading gun in the form of a saw-tooth of an effective duration of 52 μsec followed by a return interval of less than 12 sec in the case of a standard 625-line television.

The reading picture scanning is ensured by a current in the corresponding coil of the reading gun. This current is in the form of a discontinuous saw-tooth, the discontinuity corresponding to the edges of the target.

The more specific writing line scanning adopts the triangular shape. The beam emitted by the cathode is focused and consequently deflected so as to travel from the left to the right and then from the right to the left over the target with stoppage on the left during the emission blocking time of the Wehnelt grid.

The writing picture scanning selects both the written line and the erased line when the writing and erasing are carried out by the same gun. It will be assumed that the written line which precedes the erasing of a previously-written line is placed on the target a little below the last-mentioned line.

Note that the notions: right, left, top and bottom on the target have only a relative value and are employed merely to clarify and have no real special significance.

One embodiment of the device according to the invention is described with reference to the accompanying drawings, in which:

FIG. 1 diagrammatically recalls, as mentioned hereinbefore the mode of operation of the memory tubes employed;

FIG. 2 shows in the form of a block diagram one embodiment of the device according to the invention;

FIGS. 3a–m represent different characteristic signals of the invention;

Figure 1:
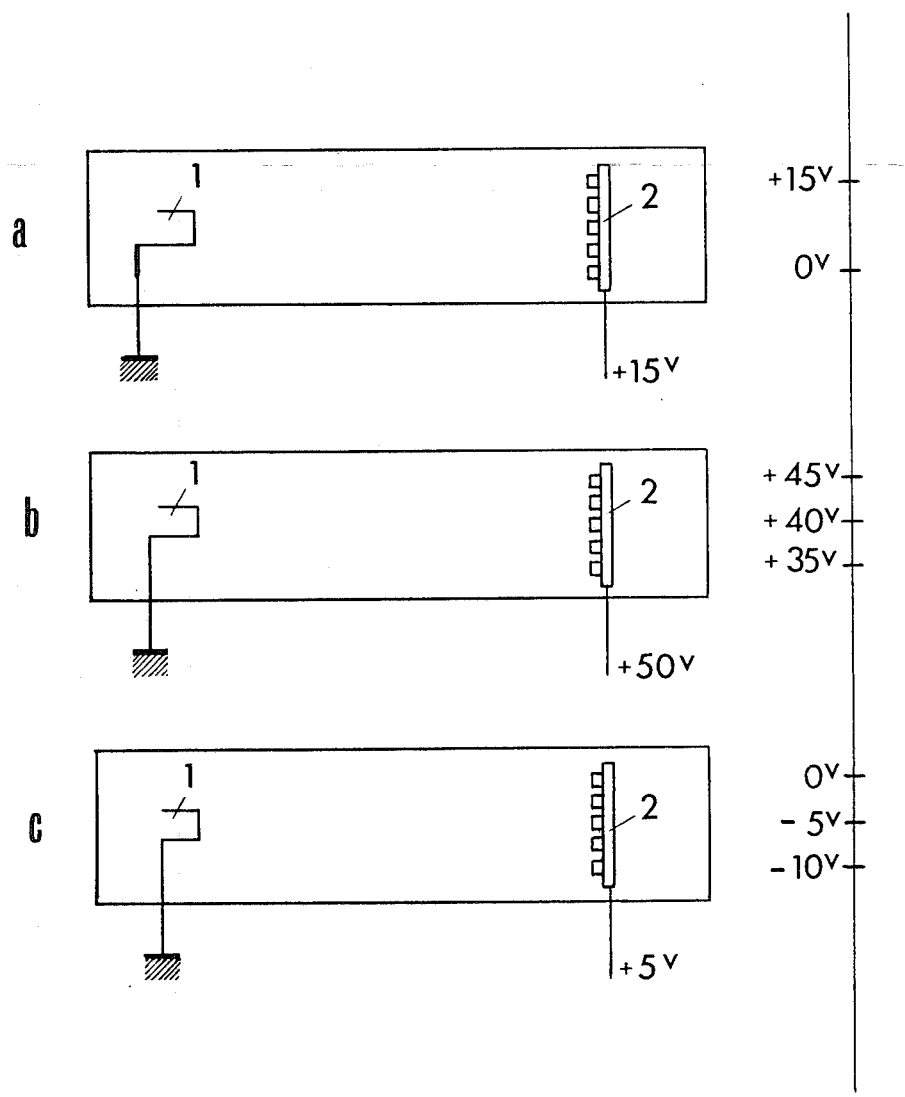

Diagram a of FIG. 1 corresponds to the operation of the gun in the erasing position. For this, the cathode 1 is grounded and the target 2 is brought to a potential of +15 V.

As the target 2 is erased, the recording memory tube is put into the writing position by bringing the target 2 to a voltage of 50 V, the cathode remaining grounded as in diagram b of FIG. 1. Under the influence of the writing the islands of the memory target are brought to potentials varying from 35 V to 45 V. The diagram c of this FIG. 1 represents the operation of the recording memory tube in the reading position, the cathode still being grounded, the target being brought to a potential of +5 V, which brings the islands of the target to potentials varying between −10 V to 0 V.

It will be obvious that the functions of erasing, reading and writing are determined by the value of the cathode-target potential difference; it amounts to the same thing to leave the target at a fixed potential and vary the voltage of the cathode.

Figure 2:
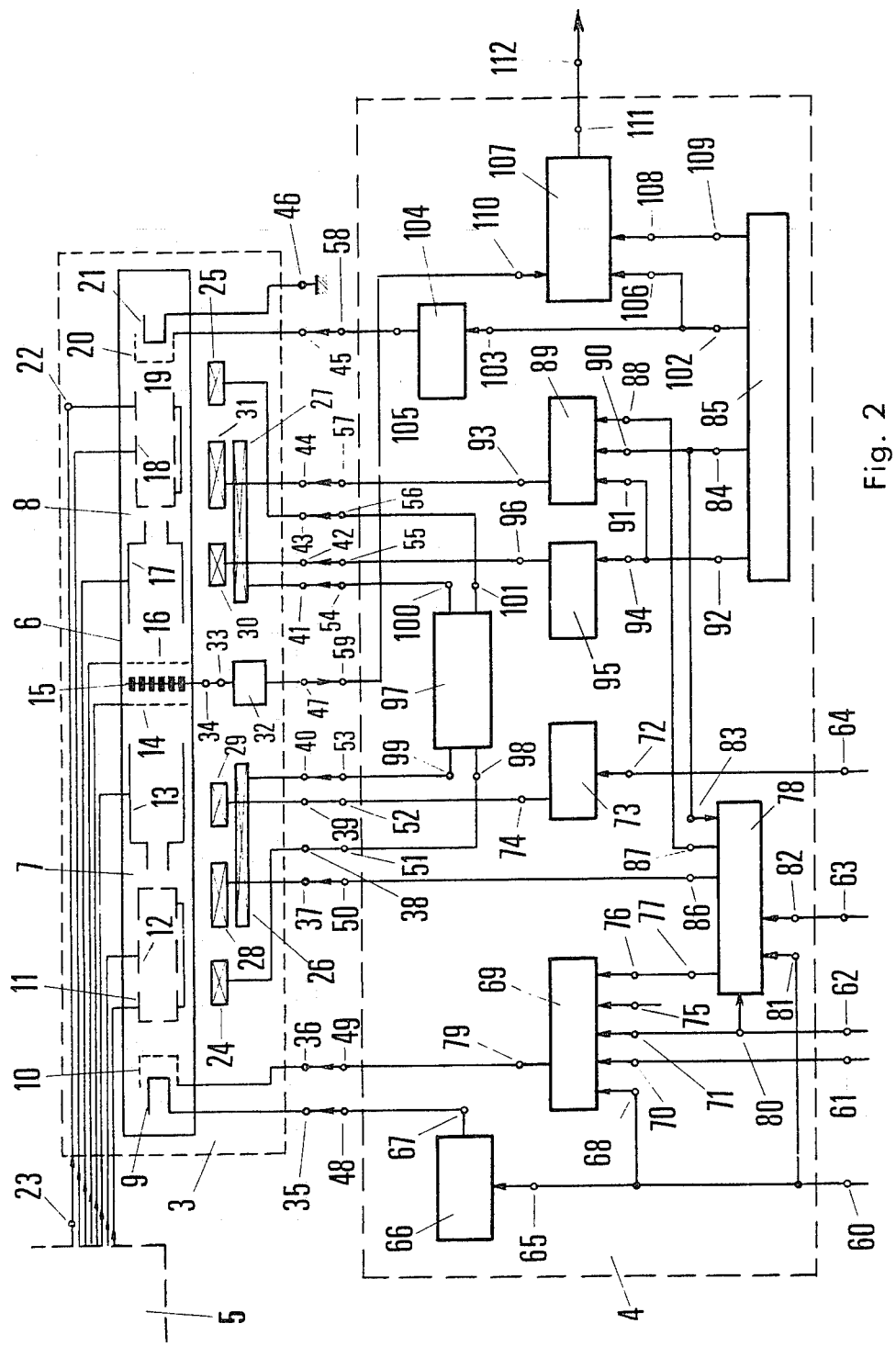

FIG. 2 shows diagrammatically a preferred embodiment of the device according to the invention. This device comprises three main units: the unit 3 or tube unit, the unit 4 or electronic drawer unit and the unit 5 or d-c supply unit.

The tube unit 3 contains essentially the double gun tube 6 whose part 7 shown on the left side of FIG. 2 performs the writing and erasing operations and part 8 shown on the right side of FIG. 2 performs the reading operation. Inside this double gun tube, there are, from the left to the right, in succession: a cathode 9, a Wehnelt grid 10, three electronic optical grids 11, 12, 13, a field grid 14 whose function is to render the electronic paths perpendicular to the target 15 throughout its effective area, a field grid 16, three electronic optical grids 17, 18 and 19, a Wehnelt grid 20 and a cathode 21.

In the device, the electronical optical and field grids are brought to fixed potentials, their input terminals, such as the terminal 22, being connected to the output terminals, such as the terminal 23, of the supply unit 5. By way of example, for good operation, the grids 11, 12, 18 and 19 are brought to potential of 450 V, the potentials of the grids 13 and 17 are adjustable between 350 and 500 V and the grids 14 and 16 are at the potential of 650 V.

The double gun tube 6 is provided with aligning coils 24 and 25, focusing coils 26 and 27, and deflecting coils 28, 29, 30 and 31. The tube unit 3 also comprises a preamplifier 32 whose input terminal 33 is connected to the output terminal 34 of the target 15. The input terminals 35 to 46 of this tube unit 3 are respectively connected, in respect of the terminal 35, to the cathode 9, in respect to the terminal 36, to the Wehnelt grid 10, in respect of the terminal 37, to the image deflecting coil 28, in respect of the terminal 38, to the aligning coil 24, in respect of the terminal 39, to the line deflecting coil 29, in respect of the terminal 40, to the focusing coil 26, in respect of the terminal 41, to the focusing coil 27, in respect of the terminal 42, to the line deflecting coil 30, in respect of the terminal 43, to the aligning coil 25, in respect of the terminal 44, to the image deflecting coil 31, in respect of the terminal 45, to the Wehnelt grid 20 and in respect of the terminal 46, to the cathode 21.

In this embodiment of the device, the input terminal 46 is directly grounded whereas the input terminals 35–45 are connected to the output terminals 48–58 of the electronic unit 4 whose input terminal 59 is connected to the output terminal 47 of the tube unit 3 and whose input terminals 60-64 receive different signals produced by the single line scanning device.

Figure 3:
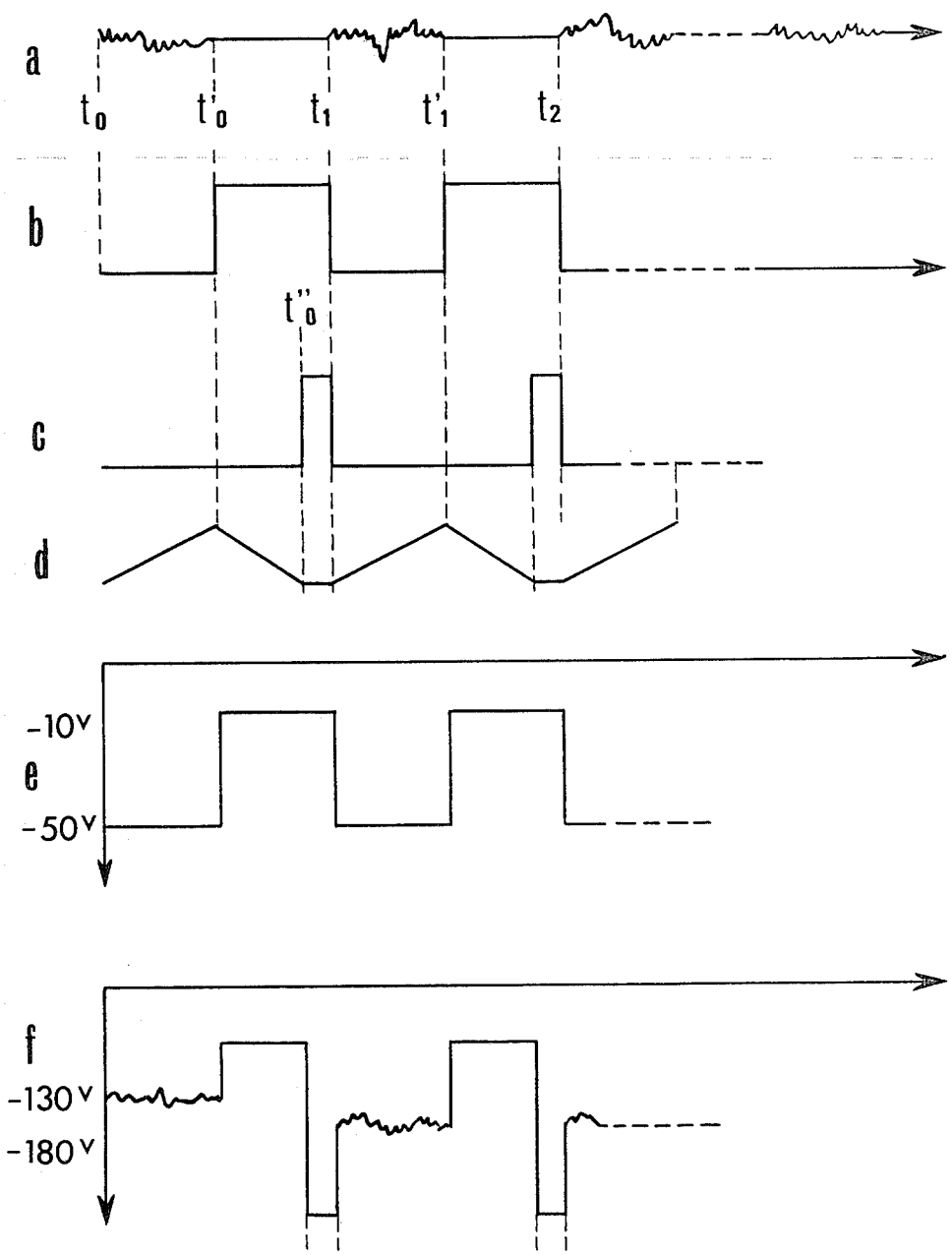
Figure 3:
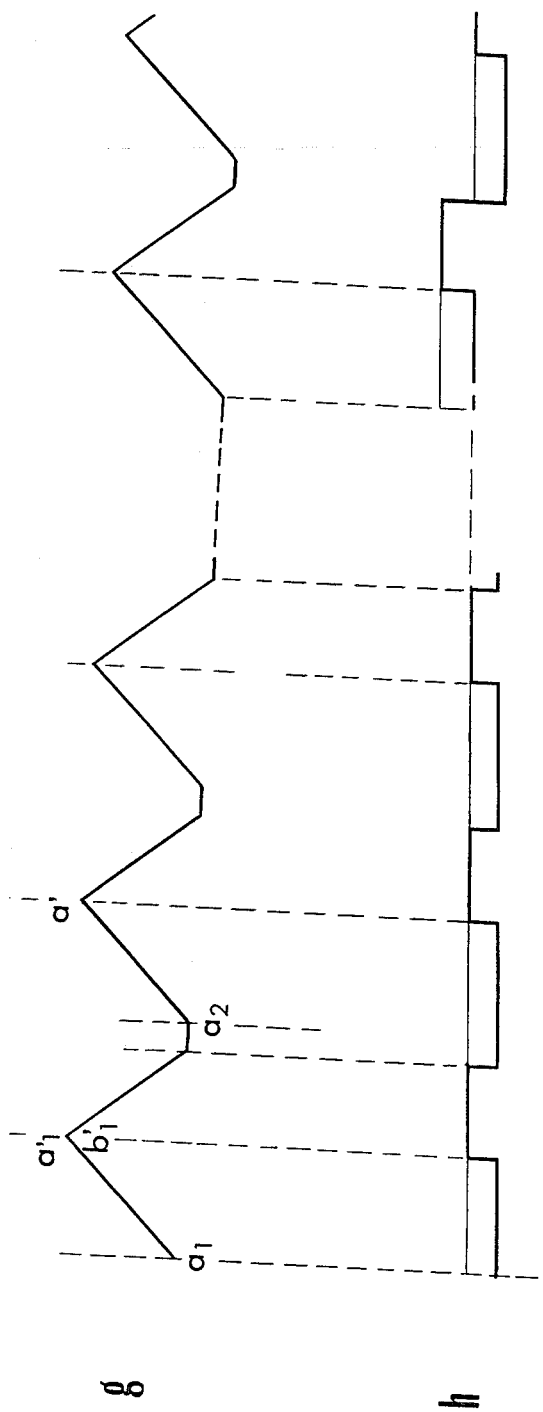
Figure 3:
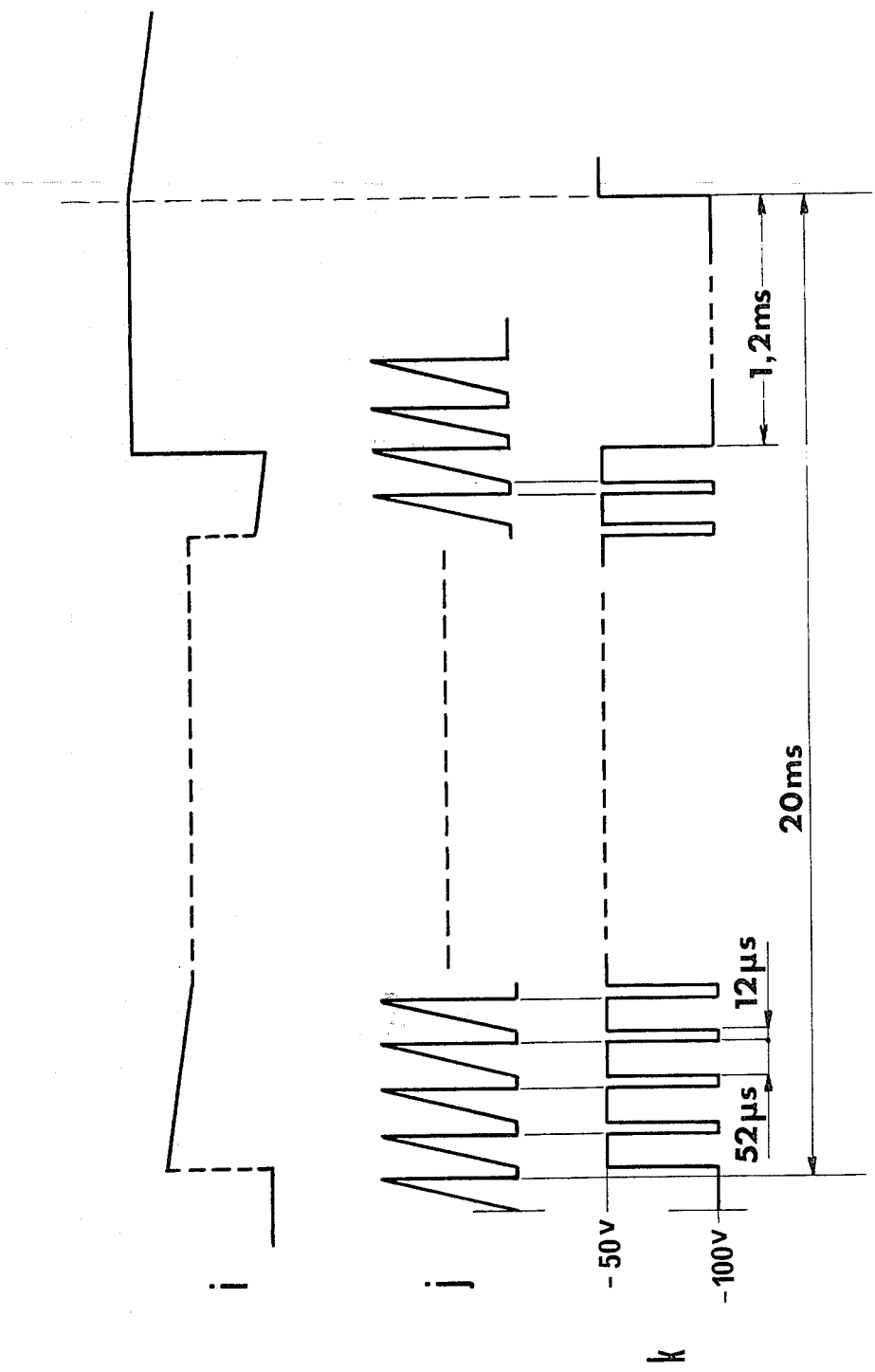
Figure 3:
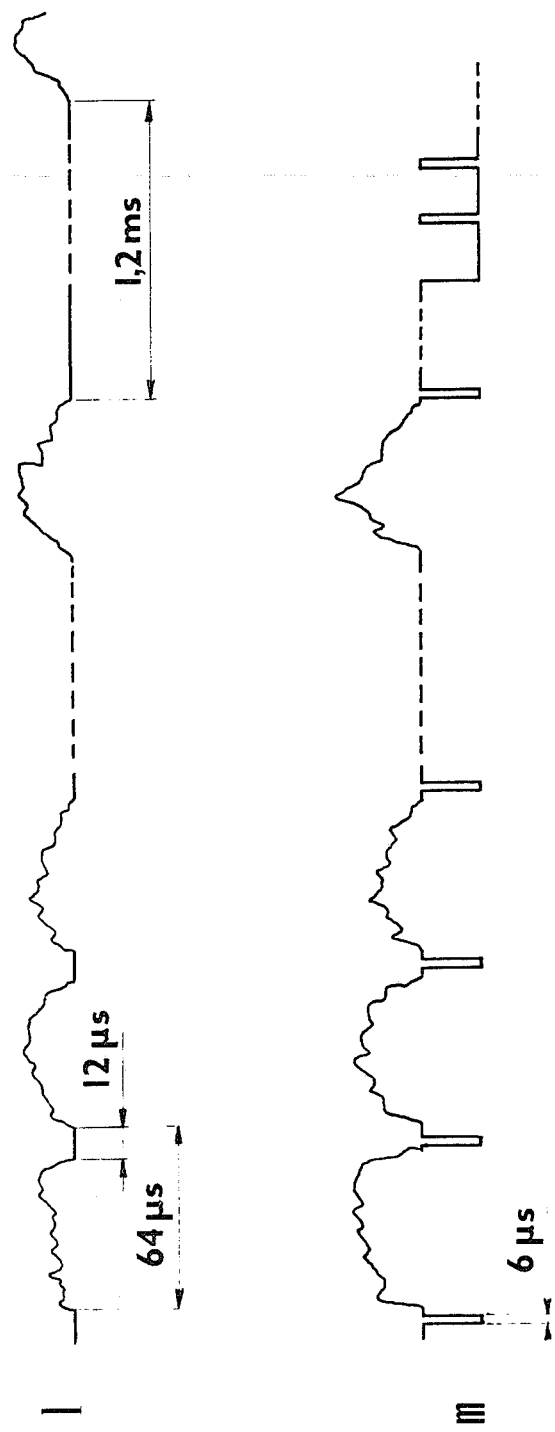

There is applied to the input terminal 60 a rectangular signal having the shape shown in the diagram b of FIG. 3, this signal having a certain level during a time $t_o\, t'_o$ which corresponds to the effective time of the video signal shown in the diagram a of FIG. 3, and another level during the time $t_o\, t'_o$, which corresponds to the dead time of this video signal. The input terminal 60 is connected to the input terminal 65 of the device 66 producing the current of the cathode 9. The output terminal 67 of the device 66 is connected to the output terminal 48 of the electronic unit 4. The shape of the signal at its terminal is that shown in the diagram e of FIG. 3. This input terminal 60 is also connected to the input terminal 68 of the device 69 producing the voltage of the Wehnelt grid 10. This device 69 receives, through its input terminal 70 connected to the input terminal 61, the video signal such as that shown in diagram a of FIG. 3, and, through its input terminal 71 connected to the input terminal 62, a line blocking signal, which signal is shown in the diagram c. of FIG. 3. This signal comes either directly from the single line scanning device or from an associated device (not shown in FIG. 2) which produces it from the video signal. The same is true of the sawtooth signal, such as that shown in diagram d of FIG. 3, which supplies the input terminal 64 of the electronic unit 4. This terminal is connected to the input terminal 72 of the device 73 producing the scanning current of the line coil 29 (diagram g). The output terminal 74 of this device 73 is connected to the output terminal 52 of the electronic unit 4.

The input terminal 75 of the device 69 producing the current of the Wehnelt grid 10 is a manually controlled blocking terminal, and the input terminal 76 is connected to the output terminal 77 of the device 78 producing the current of the picture scanning coil 28 and permits the blocking of the Wehnelt grid during the return interval of the picture scanning. The output terminal 79 of this device 69 is connected to the output terminal 49 of the electronic unit 4, the signal at this terminal having the shape shown in diagram f of FIG. 3.

The device 78 producing the current of the writing picture scanning coil 28 is connected, by its input terminal 80, to the input terminal 62, by its input terminal 81, to the input terminal 60, by its input terminal 82 to the input terminal 63 which is supplied with the V/H signal and, by its input terminal 83, to the output terminal 84 of the television synchronization generator 85. The output terminal 86 of this device 78 is connected to the output terminal 50 of the electronic unit 4 (the signal at this terminal is shown in the diagram h) and the output terminal 87 of the device 78 is connected to the input terminal 88 of the device 89 producing the current of the picture scanning coil 31. The two other input terminals 90 and 91 are respectively connected, in respect of the input terminal 90, to the output terminal 84 of the synchronization generator 85 and, in respect of the input terminal 91, to the output terminal 92 of this generator 85, the first connection transmitting the picture return signal and the second the line return signal. The output terminal 93 of the device 89 is connected to the output terminal 57 of the electronic unit 4 and receives a signal having the shape shown in diagram i of FIG. 3, which signal supplies the picture scanning coil 3 of the reading gun 8.

The input terminal 94 of the device 95 producing the scanning current of the line coil 30 is also connected to the output terminal 92 of the television synchronization generator 85; the output terminal 96 of this device 95 is connected to the output terminal 55 of the electronic unit 4; there is received thereat a signal having the shape shown in diagram j of FIG. 3.

The device 97 supplying the focusing and aligning coils is included in the electronic unit 4; its output terminals 98, 99, 100 and 101 are respectively connected to the output terminals 51, 53, 54 and 56 of the unit 4.

The output terminal 102 of the television synchronization generator 85 is connected to the output terminal 103 of the device 104 producing the control signal of the Wehnelt grid 20 of the reading gun 8. There is received at the output terminal 58 of the electronic unit 4, connected to the output terminal 105 of the device 104, a signal having the shape shown in diagram k of FIG. 3.

The input terminal 106 of the amplifier 107 of the television video signal is also connected to the output terminal 102 of the television generator 85. This amplifier 107 is also connected, through its input terminal 108, to the output terminal 109 of the generator 85, and, through its input terminal 110, to the input terminal 59 of the electronic unit 4. At this terminal is received the reading video signal which has the shape shown in diagram 1 of FIG. 3. The output terminal 111 of the amplifier 107 is connected to the output terminal 112 of the electronic unit 4. There is received thereat a signal which has the shape shown in diagram m of FIG. 3 which may be received directly by a television receiver.

Figure 4:
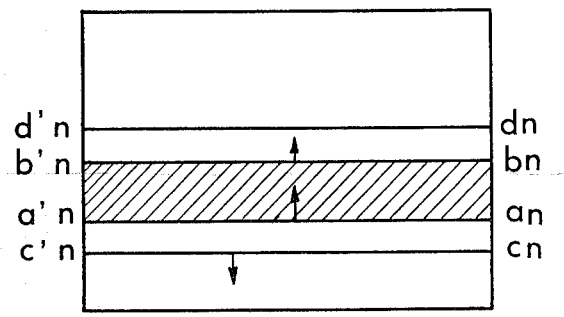
FIG. 4 shows the target on which are diagrammatically represented the writing, reading and erasing operations.
Figure 5:
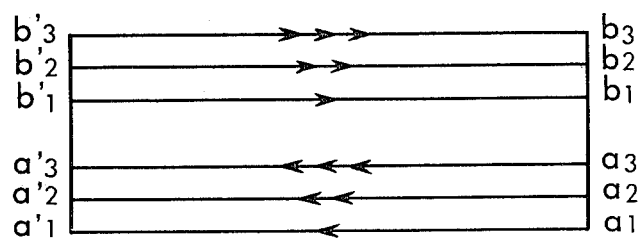
FIG. 5 represents diagrammatically the path of the line scanning of the gun for writing and erasing.

FIG. 4 is a schematic representation of the plane of the storage target and the different operations which are effected either simultaneously or in succession in this plane. By way of example, a line is written from $a_n$ to $a'_n$ then the point of impact of the electrons on the target is translated from $a'_n$ into $b'_n$ and then a line is erased from $b'_n$ to $b_n$, then the point of impact descends a little above $a_n$ and a new line is written. The point of impact of the electrons follow the path shown in FIG. 5, namely $a_1$, $a'_1$, $b'_1$, $b_1$, $a_2$, $a'_2$, $b'_2$, $b_2$, $a_3$, $a'_3$, $b'_3$, $b_3$. The zone between a writing line $a'$ and the following erasing line $b'b$ is the erased zone of the target. In FIG. 4 this zone is represented cross-hatched; in the course of time this zone moves upwardly of the target as shown in FIG. 5, it being understood that the lower and upper notions of the target are relative to the Figures accompanying the present specification and are purely conventional since they correspond to no physical reality of the double gun tube.

Figure 6:
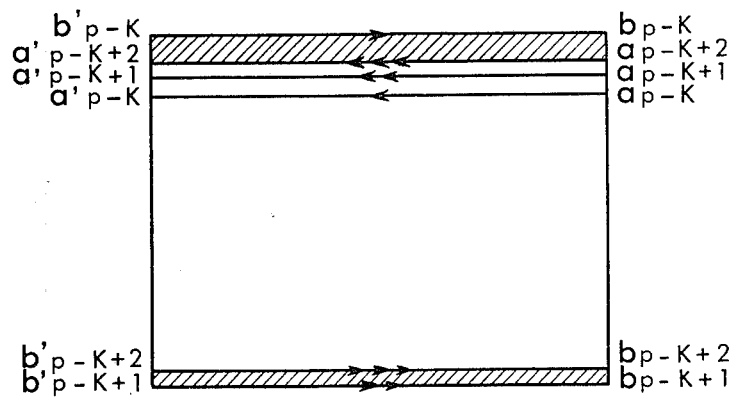
FIG. 6 represents the path of the scanning of the target in the vicinity of its ends.

FIG. 6 corresponds to the particular case of the writing and erasing when the erased zone passes from one end of the target to the other. The point of impact of the electrons then follows the path: (a,a') (p−k) (b',b) (p−k) (a,a') (p−k+1), (b',b) (p−k+1 ), (a,a') (p−k+2 ) (b',b) (p−k+2), p representing the number of lines written on the target and k the number of lines erased from this target.

In FIG. 4, in the plane of the storage target, there is also shown at $c_n\, c'_n$ the first reading line of a television picture. There is then read the line immediately below and so on until there is reached the line located at the base of the target the reading of which is followed by that of the line located at the top of the target, then the reading continues until there is reached the line $d_n\, d'_n$ which is the last line of this television picture. Upon each reading of a television picture, the lines $c_n\, c'_n$ and $d_n\, d'_n$ of the start and end of the picture are related to the position of the erased zone of the target. For this purpose the form of the voltage applied to the Wehnelt grid of the reading gun is that shown in diagram k of FIG. 3. The reading is effective when the voltage of the Wehnelt grid is at −50 V and there is no reading when the grid is at −100 V. A reading period of 52µ sec is followed by a non-reading period of 12µ sec during a time of 20 m sec corresponding to the reading of a television frame with however at the end of the 20 m sec a non-reading time of 1.2 m sec.

Figure 7:
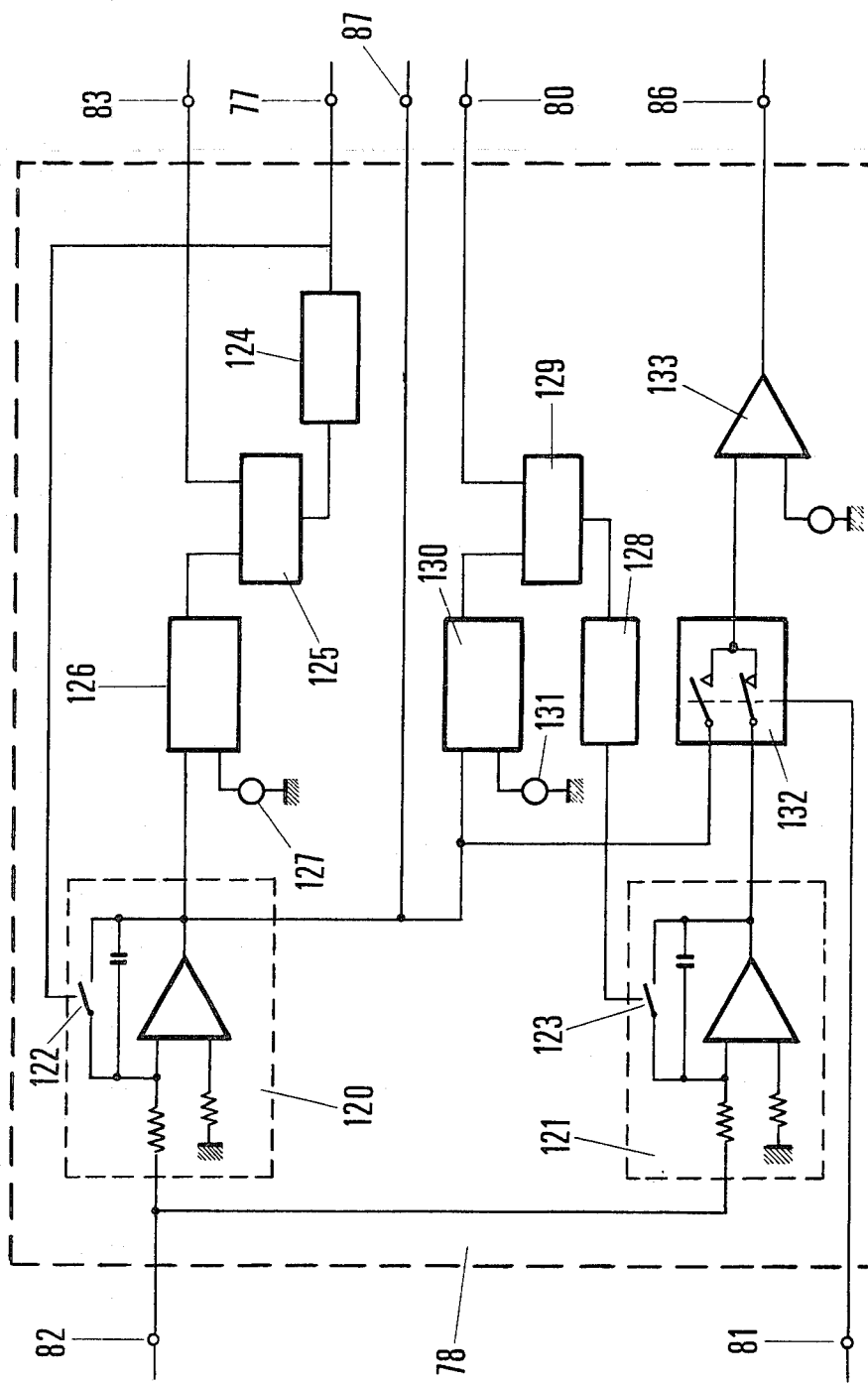
FIG. 7 represents the diagram of a device producing current in the picture scanning coil of the writing and erasing gun.

FIG. 7 is a block diagram of the device 78 producing the picture scanning current of the writing and erasing gun 7.

The terminal 82 supplied by the V/H voltage which is either furnished directly by the carrier machine or regulated by an operator, is connected to two Miller integrator systems 120 and 121 which produce from this voltage two saw-tooth voltages whose resetting is controlled by electronic switches 122 and 123.

The switch 122 closes under the control of the monostable 124, the latter operating when the flip-flop 125 receives simultaneously, on one hand, from the comparator 126, the information that the level of the saw-tooth has exceeded a certain threshold determined by the voltage of the generator 127, and, on the other hand, the signal of a return of the television picture applied to the terminal 83.

The switch 123 closes under the control of a monostable 128 which operates when the flip-flop 129 receives simultaneously, on one hand, from the comparator 130, the information that the saw-tooth produced by the integrator 120 reaches a certain level determined by the generator and, on the other hand through the input terminal 80, the information that the writing gun is in the line blocking period.

The two saw-tooth voltages thus produced supply the two electronic switches 132 the simultaneous control of which, namely the opening of one and the closing of the other, is ensured by the rectangular voltage shown in diagram b of FIG. 3 and applied to the input terminal 81.

Figure 8:
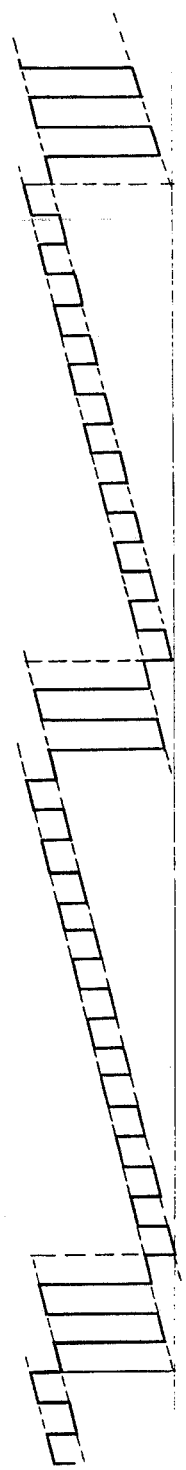
FIG. 8 represents the form of the current in the picture scanning coil of the writing and erasing gun.

The signal thus selected, after centering by the amplifier 133, supplies the output terminal 86 of the device 78. This signal has the shape shown in FIG. 8 and is applied to the picture scanning coil of the gun 7 and performs the writing and erasing operations shown in FIGS. 4, 5 and 6.

Figure 9:
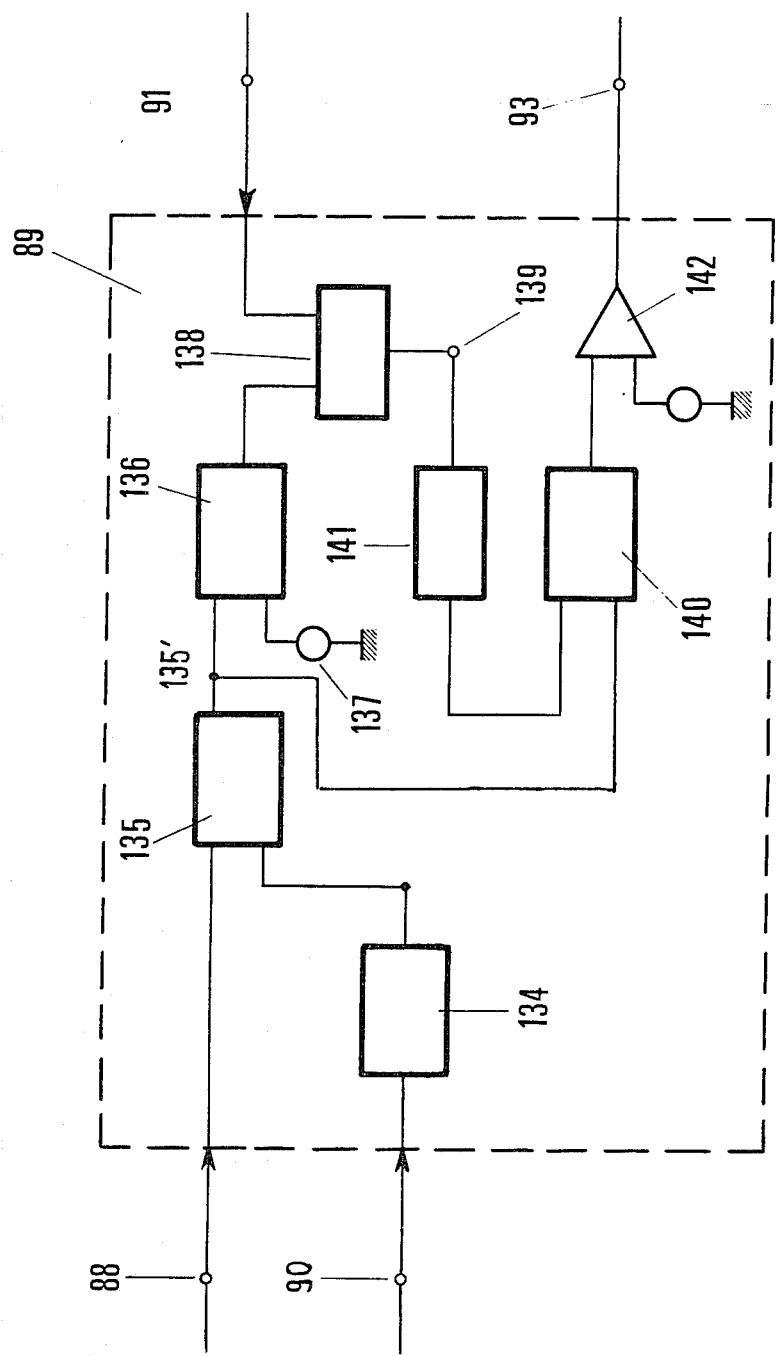
FIG. 9 represents the diagram of a device producing the supply current of the picture scanning coil of the reading gun.
Figure 10:
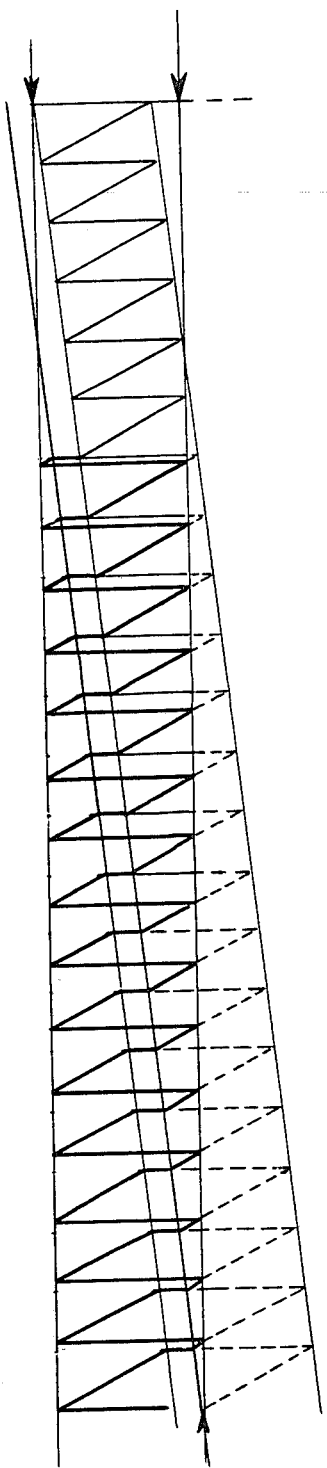
FIG. 10 represents the form of the supply current of the picture scanning coil of the reading gun.

FIG. 9 shows an embodiment of the device 89 for producing the current of the picture scanning coil of the gun 8 which performs the reading operation. The input terminal 90 supplies a saw-tooth voltage generator 134 employed in a manner conventional in television. The output signal of this generator 134 is added in the device 135 to the saw-tooth signal produced by the Miller integrator 120 (FIG. 7) and supplying the input terminal 88. The signal at the output terminal 135' of this adder 135 is compared in the comparator 136 with the voltage of the generator 137. When the flip-flop 138 receives simultaneously, from the comparator 136, the information that the output signal of the adder 135 has exceeded the voltage of the generator 137 and, from the input terminal 91, the indication of the line return, its output terminal 139 controls the addition by the device 140 of a rectangular voltage calibrated by the device 141 with the voltage at the output 135' of the adder 135. The output voltage of this adder 140, after centering in the device 142, supplies the output terminal 93 of the device 89. This voltage controls the scanning current of the picture coil of the reading gun and has the shape shown in diagram i of FIG. 3. FIG. 10 shows the shape of this scanning current of the picture coil of the reading gun but with a change in scale which permits showing in this Figure the shape of this scanning current in the course of the reading of several consecutive frames, the number of lines having been greatly reduced to permit a better understanding of the drawing.

The foregoing description of the device according to the invention relates to the case of the use of the double gun recording memory tube employed, in respect of the first gun for recording and erasing operations, and in respect of the second gun, for the reading operation, this choice being determined by the presence of a dead time in the scanning video signal. In any case, it is possible, without departing from the scope of the invention, to erase with the reading gun in taking advantage of the return interval of the picture scanning of the reading gun and it will be clear that this choice is obligatory when the scanning video signal has a dead time which is too short to permit the erasing.

In the foregoing description, each line to be erased was completely erased in one go, the scanning tube allowing a considerable erasing. In the case of erasing by the reading gun, each line to be erased would be erased slightly several consecutive times.

What I claim is:

1. A method for real time displaying on a TV monitor of a scene scanned from an aircraft by a line scan apparatus, wherein a two-gun tube is incorporated as an image storage means between the line scan apparatus and the TV monitor, said tube having a target, a writing gun connected to the output of the line scan apparatus and providing a writing beam for scanning said target to establish a charge pattern on the target, and a reading gun providing a reading beam for reading said charge pattern, comprising scanning the target by the writing gun line by line at a frame rate dependent on the speed-to-altitude ratio of the aircraft during the effective periods of the video signal from the line scan apparatus, erasing lines already written and stored so as to define on the target a moving rectangular area having no charge deposited thereon, said rectangular area comprising at least two line spaces, scanning that area of said target having charges thereon by the reading gun in accordance with the scanning standard of the TV monitor in such manner that the first and last lines read out by the reading gun during a frame scan are constantly situated on respective opposed sides of said moving rectangular area, and feeding the TV monitor with the signal from the reading gun.

2. A method as claimed in claim 1, wherein lines already written and stored are erased by the writing gun during the suppression periods of said video signal.

3. A method as claimed in claim 1, wherein lines already written and stored are erased by the reading gun by means of slight successive erasing motions during the picture fly back period of the reading gun.

4. A device for real time displaying on a TV monitor of a scene scanned from an aircraft by a line scan apparatus, comprising a two-gun tube incorporated as an image storage means between the line scan apparatus and the TV monitor, said tube having a target, a writing gun connected to the output of the line scan apparatus and providing a writing beam for scanning said target to establish a charge pattern on the target, and a reading gun connected to the TV monitor and providing a reading beam for reading said charge pattern, further comprising means for scanning the target by the writing gun line by line at a frame rate dependent on the speed-to-altitude ratio of the aircraft during the effective periods of the video signal from the line scan apparatus, means for erasing lines already written and stored so as to define on the target a moving rectangular area having no charge deposited thereon, said rectangular area comprising at least two line spaces, means for scanning that area of said target having charges thereon by the reading gun in accordance with the scanning standard of the TV monitor in such manner that the first and last lines read out by the reading gun during a frame scan are constantly situated on respective opposed sides of said moving rectangular area, and means for feeding the TV monitor with the signal from the reading gun.

* * * * *